(12) United States Patent
Renz (10) Patent No.: US 11,893,665 B2
(45) Date of Patent: Feb. 6, 2024

(54) METHOD, APPARATUS AND COMPUTER PROGRAM FOR DISPLAYING AN EVOLUTION OF A FILLING QUANTITY

(71) Applicant: Mettler-Toledo (Albstadt) GmbH, Albstadt (DE)

(72) Inventor: Uwe Renz, Albstadt (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 0 days.

(21) Appl. No.: 17/447,473

(22) Filed: Sep. 13, 2021

(65) Prior Publication Data

US 2022/0084266 A1  Mar. 17, 2022

(30) Foreign Application Priority Data

Sep. 14, 2020  (EP) ..................................... 20195951

(51) Int. Cl.
*G06T 11/20* (2006.01)
*G06F 3/0484* (2022.01)

(52) U.S. Cl.
CPC .......... *G06T 11/206* (2013.01); *G06F 3/0484* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2,974,863 A * | 3/1961 | Williams, Jr. ........ | G01G 23/163 235/61 PS |
| 4,542,799 A | 9/1985 | Komoto | |
| 4,650,014 A | 3/1987 | Oldendorf et al. | |
| 7,380,216 B2 | 5/2008 | Feig et al. | |
| 7,865,838 B2 | 1/2011 | Feig et al. | |
| 8,194,076 B2 | 6/2012 | Culpi et al. | |
| 8,347,233 B2 * | 1/2013 | Preysman ................ | G01D 7/00 715/833 |
| 8,829,365 B1 | 9/2014 | Wallace et al. | |
| 8,881,038 B1 * | 11/2014 | Palmer .................... | G06T 11/20 715/764 |
| 9,121,750 B2 | 9/2015 | Rode | |
| 9,129,419 B2 | 9/2015 | Vanhoecke | |
| 2012/0007868 A1 * | 1/2012 | Buck ..................... | G06T 11/206 345/440.1 |

(Continued)

*Primary Examiner* — Jason A Pringle-Parker
(74) *Attorney, Agent, or Firm* — Standley Law Group LLP; Jeffrey S. Standley; Adam J. Smith (57) ABSTRACT

As a container (3) is filled with a material to a very small tolerance, a method displays an evolution of a measured current filling quantity (Q) of the material, from a starting filling quantity $Q_0$ to a target filling quantity $Q_T$. A measuring means (5) measures the measured current filling quantity as filling proceeds. A display means (10) shows a first pointer (11), a position X of which is indicative of the measured current filling quantity. The position X on the display means is a monotonic function of the measured current filling quantity. As the measured current filling quantity enters a tolerance subrange on either side of the target filling quantity, a function that defines the position of the first pointer is changed to permit accurate filling, but in a manner so that a user of the measuring means does not perceive a discontinuity in the display.

16 Claims, 7 Drawing Sheets

(56) References Cited

U.S. PATENT DOCUMENTS

| | | | | |
|---|---|---|---|---|
| 2012/0314059 A1* | 12/2012 | Hoffmann | G06T 7/0004 | 348/135 |
| 2013/0069949 A1* | 3/2013 | Dembo | G06T 11/206 | 345/440 |
| 2013/0144431 A1* | 6/2013 | Tidhar | B65B 5/103 | 700/231 |
| 2014/0019312 A1* | 1/2014 | Renz | G06Q 10/10 | 705/28 |
| 2014/0350801 A1* | 11/2014 | Bonefas | B60R 11/04 | 701/50 |
| 2016/0073019 A1* | 3/2016 | Nowicki | H04N 5/2252 | 348/135 |
| 2016/0203640 A1* | 7/2016 | Breedvelt-Schouten | G06V 40/107 | 345/633 |
| 2017/0042088 A1* | 2/2017 | Nykamp | A01D 41/127 | |
| 2017/0090741 A1* | 3/2017 | Tentinger | G06F 3/042 | |
| 2017/0206645 A1* | 7/2017 | Bonefas | G06T 7/0004 | |
| 2017/0314981 A1* | 11/2017 | Flockenhaus | G06Q 10/087 | |
| 2018/0364091 A1* | 12/2018 | Godsey | G06F 3/0482 | |
| 2019/0062137 A1* | 2/2019 | Schick | B67D 1/0034 | |
| 2020/0109963 A1* | 4/2020 | Zass | G05D 1/0094 | |
| 2020/0178049 A1* | 6/2020 | Suleman | H04W 12/64 | |

* cited by examiner

METHOD, APPARATUS AND COMPUTER PROGRAM FOR DISPLAYING AN EVOLUTION OF A FILLING QUANTITY

CROSS-REFERENCE TO RELATED APPLICATIONS

This application makes a claim of priority to European application 20195951.7, filed 14 Sep. 2020, which is incorporated by reference as if fully recited herein.

TECHNICAL FIELD

The disclosure is related the filling of a measured filling quantity of a material into a container during a filling operation. The disclosure provides a method for displaying an evolution of the measured filling quantity from a starting filling quantity to a target filling quantity. While measuring a measured current filling quantity, using a measurement means, a display means displays the measured current filling quantity as a first pointer. A position of the first pointer on the display means is a monotonic representation of the measured current filling quantity. Also disclosed are an apparatus and a computer program for carrying out the method.

BACKGROUND ART

In various industries, including the pharmaceutical or the food and beverage industry, the constituent materials of a product are quantified in a recipe. It is not uncommon that it is the task of a human operator to fill target quantities of the various materials as specified in the recipe into a container. In particular in the pharmaceutical industry, it is of utmost importance that the operator fills the respective material in the required target filling quantity and with limited upper and lower tolerances which may be as low as 1% or less.

As an example, the target filling quantity of the material to be filled into the container may be a given weight. Thus, the operator may arrange the container on weighing means, for example a scale. The weighing means may be connected with display means adapted to display the current measured filling quantity, that is. the weight of the material present in the container. The operator may start filling the material into the container and monitor the displayed weight during the filling process.

To assist the operator during the filling process, it is known to display a first pointer in the form of an end of a bar graph on the display means, wherein the position of the first pointer on the display means is proportional to the measured current filling quantity in the container (see for example U.S. Pat. No. 8,829,365 B1). Generally, the position X of the first pointer on the display means is a linear function of the measured current filling quantity, $X(Q)=A \cdot Q$, wherein Q denotes the measured current filling quantity, and A is a real number. A target indicator may be displayed on the display means, and the target filling quantity is reached when the position of the first pointer coincides with the position of the target indicator. Furthermore, upper and lower limit indicators may be displayed on the display means to indicate the tolerance range.

For economic reasons, the filling operation should be performed as fast as possible. However, if the operator makes an error and does not manage to fill the material within the given upper and lower tolerances, the filled batch must be time-consumingly corrected or even disposed of. As the position of the first pointer, that is, the position of the end of the bar graph, on the display means is a linear function of the measured current quantity, it may, however, be very difficult for the operator to fill the material in the required target quantity and within tolerance. This is due to the fact that a tolerance of 1% on the display may hardly be perceptible by the human eye.

To overcome this problem, the state of the art suggests to "zoom in" into the region of the tolerance, as it is explained for example in U.S. Pat. Nos. 9,129,419 B2, 8,347,233 B2 and 8,194,076 B2. If the length of the bar graph as displayed on the display means for a given current measured filling quantity is defined as the "bar graph length", the bar graph length at the target filling quantity $Q_T$ is defined as the "target length" $L_T$, and the lower tolerance $T_L$ is 1% of the target filling quantity $Q_T$, a current measured filling quantity Q of 99% may be represented by a bar graph length of 80% of the target length. I.e., the position X of the first pointer is given by $$X(Q) = 0.8 \cdot L_T \frac{Q}{Q_L}$$

for Q up to a lower limit value $Q_L$ defined as the target filling quantity minus the lower tolerance, $Q_L=Q_T-T_L$. The remaining 1% of the measured current filling quantity Q may correspond to 20% of the target length. I.e., $$X(Q) = 0.2 L_T \frac{Q}{Q_T - Q_L} + const$$

for Q between the lower limit quantity and the target filling quantity. In this way, the change of the position of the first pointer, $\Delta X$ for a given change of the measured current filling quantity $\Delta Q$ of the measured current filling quantity above the lower limit quantity is much larger than for the measured current filling quantity below the lower limit quantity. Thus, the operator may be able to monitor the filling operation within the tolerance limits.

While this "zooming in" into the region of the tolerance enables a human operator to perceive the change of the position of the first pointer within the region of tolerance, this solution has the following problem: During the filling operation the operator will monitor the position of the first pointer. When the operator is filling the container below the lower limit value with a filling speed $$\frac{dQ}{dt} = v_0,$$

the perceived speed of the first pointer, that is, the positional change of the position of the first pointer (end of the bar graph) with respect to time is given by $$\frac{dX}{dt} = \frac{dX}{dQ}\frac{dQ}{dt} = A1\frac{dQ}{dt},$$

wherein $$A_1 = 0.8 \cdot \frac{L_T}{Q_L}.$$

When the operator reaches the region of tolerance, the perceived speed of the first pointer is given by $$\frac{dX}{dt} = A2 \cdot \frac{dQ}{dt},$$

wherein $$A_2 = 0.2 \frac{L_T}{Q_T - Q_L}.$$

As $Q_T-Q_L$ is generally much smaller than $Q_T$, A2 is much bigger than A1. Thus, there is a sudden change in the perceived speed of the first pointer at the lower limit quantity, which cannot be compensated by the operator. Thus, an operator who is filling at a moderate filling speed all the way to the lower tolerance overshoots the target filling quantity with no chance to stay within the tolerance limits. To overcome this problem, the operator must fill with a very slow filling speed way below the lower limit quantity which increases the process time and thus the costs for producing the product.

In light of these problems in the prior art, it is an object of the present invention to present a method, an apparatus and a computer program for displaying an evolution of a filling quantity of a material in a container as mentioned above in such a way that an operator may perform the filling operation quickly and accurately.

SUMMARY

According to a first aspect of the present invention, this object is attained in that a pointer speed of said first pointer being defined as a positional change of said first pointer on said display means with respect to a change of the measured current filling quantity is a strictly increasing function for at least a subrange of the measured current filling quantity in the range between the starting filling quantity and the target filling quantity, while a pointer acceleration of said first pointer being defined as a change of the pointer speed with respect to a change of the measured current filling quantity does not cause a human perception of the displaying to include a discontinuity.

According to the first aspect of the present invention, there is provided a method for displaying an evolution of a filling quantity of a material in a container during a filling operation. The filling quantity may be any quantity that is measurable by measurement means, including but not limited to, weight, number of pieces or volume. The filling operation is carried out from a starting filling quantity $Q_0$ to a target filling quantity $Q_T$. The starting filling quantity may be zero. If the starting filling quantity is not zero, a tare operation may be carried out before the start of the filling operation. The target filling quantity may be given by a recipe.

The filling operation may be manually carried out by a human operator, that is, there is a human operator who fills material, for example, from a storage means, into the container.

The method according to the present invention includes measuring, by measurement means, a measured current filling quantity in the container. The measurement means may be weighing means, for example a scale. The method may start with arranging the container on the weighing means. Then, a tare operation may be carried out. After that, the operator may start filling material into the container. Alternatively, the measurement means may be adapted to measure the number of pieces or the filling volume.

The method according to the present invention further comprises displaying, on display means, a first pointer, the position of said first pointer on said display means being indicative of the measured current filling quantity Q. The display means may be an analog or a digital display. The operator may monitor the position of said first pointer on said display means during the filling operation. A target marker $m_T$ may be displayed on the display means at a position $X_T$ corresponding to the position of the first pointer at the target filling quantity $Q_T$. When the position of the first pointer on the display means reaches $X_T$, the operator knows that the target filling quantity is reached.

The position of said first pointer on said display means is a monotonic function of the measured current filling quantity. The function may be strictly monotonic. The position of said first pointer may be defined as a distance from a starting position $X_0$.

According to the method of the present invention, a pointer speed of said first pointer being defined as a positional change of said first pointer on said display means with respect to a change of the measured current filling quantity is a strictly increasing function for at least a subrange of the measured current filling quantity in the range between the starting filling quantity and the target filling quantity. That is, there is at least a subrange $[Q_1, Q_2]$ in the range $[Q_0, Q_T]$ from the starting filling quantity $Q_0$ (which may be zero) to the target filling quantity $Q_T$ wherein, with an increasing measured current filling quantity Q in the container, the pointer speed v(Q) of said first pointer increases. In one possible example of the present invention, the pointer speed is a strictly increasing function in the whole range between the starting filling quantity $Q_0$ and the target filling quantity $Q_T$. Furthermore, according to the method of the present invention, a pointer acceleration of said first pointer being defined as the change of the pointer speed with respect to a change of the measured current filling quantity is such as not to cause a human perception of the displaying to include a discontinuity.

The effect of this behavior of the pointer speed and the pointer acceleration is based on the fact that the human brain does not like changes. If an operator looks at the position of the first pointer displayed on the display means and starts filling the container placed on the measurement means, he/she automatically tries to keep the change of the position of the first pointer with respect to time constant in order to reach a predictable result. I. e., he/she will try to keep the perceived speed of the first pointer $$\frac{dX}{dt} = \frac{dX}{dQ} \cdot \frac{dQ}{dt} \text{ constant,}$$

where X is the position of the first pointer on the display means, Q is the measured current filling quantity and t is the time. If, at some point, the pointer speed of the first pointer, v(Q)=dX/dQ is increased, the operator will automatically slow down his/her filling speed dQ/dt in order to keep the perceived speed dX/dt constant. This process goes unnoticed by the operator as the eye-hand coordination is a natural behavior.

Furthermore, the pointer acceleration $$A(Q) = \frac{d^2X}{dQ^2}$$

is limited to avoid a discontinuity in the resulting human perception of an average human operator. I. e., the perceived acceleration of the first pointer, $$\frac{d^2X}{dt^2} = \frac{d^2X}{dQ^2}\left(\frac{dQ}{dt}\right)^2 + \frac{dX}{dQ}\frac{d^2Q}{dt^2},$$

which governs the perception of the positional change of the first pointer on the display means by the operator looking on the display means, does not cause this perception of an abrupt positional change. That is, there is no human perception of a discontinuity in $$\frac{dX}{dt}.$$

Thus, when the operator fills the container smoothly, there is never a sudden change of the perceived speed of the first pointer according to human perception, which might startle the operator and jeopardize the filling operation. According to the operator's perception, a smooth and continuous filling of the container is displayed as a smooth and continuous movement of the position of the first pointer on the display means.

According to an embodiment of the method of the present invention, said first pointer comprises an end of a bar graph. Then, the position of said first pointer on said display means may correspond to the length of the bar graph. This is a particularly intuitive representation of the first pointer. The length of the bar graph is then a monotonic function of the measured current filling quantity and may increase with increasing measured current filling quantity. Alternatively, the length of the bar graph may decrease with measured current filling quantity in a monotonic way.

According to another embodiment of the present invention, the pointer acceleration may be a continuous function of the measured filling quantity. This implies that the pointer speed of said first pointer is a continuous function as well. This allows for a particularly easy implementation of the above method.

In another example, the method of the present invention may comprise determining the position of said pointer on said display means by electronic data-processing means. The electronic data-processing means may be adapted to receive the measured current filling quantity from said measurement means, to calculate the position of said first pointer on said display means and to output the position of said first pointer to said display means.

In one embodiment of the method according to the present invention, said position of said first pointer may be defined as a first function X1(Q) of the measured current filling quantity in a first range from a starting filling quantity to a first intermediate filling quantity, and said position of said first pointer may be defined as a second function X2(Q) of the measured current filling quantity different from the first function in a second range from the first intermediate filling quantity to the target filling quantity. Then, there is a first pointer speed $$\frac{dX1}{dQ}.$$

of said first pointer in the first range of the measured current filling quantity corresponding to the first function X1(Q). Furthermore, there is a second pointer speed $$\frac{dX2}{dQ}$$

of said position of said first pointer in the second range of the measured current filling quantity corresponding to the second function X2(Q). The first function X1(Q) and the second function X2(Q) may be, for example, chosen such that the first pointer speed $$\frac{dX1}{dQ}$$

starts at a relatively low value at the starting filling quantity and then increases to a much higher value close to the first intermediate filling quantity. Then, the operator may start with a relatively high filling speed $$\frac{dQ}{dt}$$

at starting of the filling operation and is then slowed down while approaching the first intermediate filling quantity. The first function and the second function may be chosen such that the pointer speed is continuous at the first intermediate filling quantity.

According to one embodiment of the method of the present invention, the filling operation may comprise filling the container with a filling quantity in the range of a lower limit quantity and an upper limit quantity, wherein the lower limit quantity is defined as the target filling quantity minus a lower tolerance, and the upper limit quantity is defined as the target filling quantity plus an upper tolerance, and wherein said first intermediate filling quantity is the lower limit quantity. When the first pointer comprises an end of a bar graph, the position of said first pointer on the display means may correspond to the length of the bar graph. Let $L_{max}$ be the maximum length of the bar graph displayed on the display means. Then, the first function may be defined such that the length of the bar graph corresponding to the lower limit quantity is 60% of the maximum length $L_{max}$ of the bar graph. The second function may be chosen such that the length of the bar graph corresponding to the target filling quantity is 85% of the maximum length $L_{max}$ of the bar graph, and that the length of the bar graph at the upper limit quantity is 100% of the maximum length $L_{max}$ of the bar graph. Furthermore, the pointer speed of the first pointer defined by the first function may be strictly increasing between the starting filling quantity and the lower limit quantity. Furthermore, the second function in the second range (between the lower limit quantity and the upper limit quantity) may be a linear function. In this way, the operator who involuntarily wants to keep the perceived speed of the bar graph constant, will slow down his/her filling speed from the starting filling quantity to the lower limit quantity. Once the lower limit quantity is reached, the operator will keep a relatively low constant filling speed up to or close to the target filling quantity. In this way, a very quick and very accurate filling operation within very small tolerances, as they are for example needed in the pharmaceutical industry, is possible.

As one possible example of an embodiment of the present invention, the first function X1(Q) which is defined for a measured current filling quantity Q in the range of the starting filling quantity to the lower limit filling quantity, $Q_0 \leq Q < Q_L$, may be given by $$\frac{1-df}{1-df\left(\frac{Q}{Q_L}\right)^{\frac{1}{N}}} X_L,$$

where 0<df<1 is a damping factor, and preferably df=0.99, $Q_L$ is the lower limit quantity, the radicand N>0 is a real number, and $X_L$ is a first pointer position at the lower limit quantity $Q_L$, and the second function X2(Q) which is defined for a measured current filling quantity in the range of $Q \geq Q_L$ may be given by $$\frac{Q-Q_L}{Q_T-Q_L}(X_T - X_L) + X_L,$$

wherein $X_T$ is the position of the first pointer at the target filling quantity $Q_T$.

In a preferred embodiment, the radicand N may be given by $$N = 6 + 3\left(1 - \frac{Q_L}{Q_T}\right).$$

The method may further comprise displaying of a second pointer on said display means, the position of said second pointer corresponding to the position of a vernier within the range of the upper and lower limit quantities. The position of the second pointer as a function of the measured current filling quantity may be as follows: From the starting filling quantity to a vernier starting quantity, the pointer speed and thus the perceived speed of the second pointer is zero, that is, it does not move. When the vernier starting quantity is reached, the second pointer may start moving from a vernier starting position. The vernier starting position may be identical to the starting position of the first pointer at the starting filling quantity. The second pointer may then move with a pointer speed which is higher than the pointer speed of the first pointer. From the lower limit quantity to the target filling quantity, the pointer speed of the second pointer may be constant. At the target filling quantity, the position of the first pointer and the position of the second pointer may be identical. In this way, the second pointer may be an additional aid, which "magnifies" the filling operation from the lower limit quantity to the target quantity. It serves as a guide to the operator's eye and thus helps to increase the accuracy of the filling process.

According to a second aspect of the present invention, there is provided an apparatus for displaying an evolution of a filling quantity of a material in a container from a starting filling quantity to a target filling quantity during a filling operation, the apparatus comprising: measurement means for measuring a measured current filling quantity in the container; display means for displaying a first pointer, the position of said first pointer on said display means being indicative of the measured current filling quantity; data processing means, said data processing means being adapted to receive said measured current filling quantity from said measurement means, to calculate the position of said first pointer on said display means as a monotonic function of said measured current filling quantity, and to output said position of said first pointer to said display means, wherein a pointer speed of said first pointer being defined as a positional change of said first pointer on said display means with respect to a change of the measured current filling quantity is a strictly increasing function for at least a subrange of the measured current filling quantity in the range between the starting filling quantity and the target filling quantity, while a pointer acceleration of said first pointer being defined as a change of the pointer speed with respect to a change of the measured current filling quantity does not cause a human perception of the displaying to include a discontinuity.

The apparatus is thus adapted to carry out the method according to the first aspect.

Everything which was said above in relation to the method also applies to the apparatus and is not repeated.

The data processing means may comprise electronic data processing means. The display means may comprise analog or digital display means.

In one embodiment of the apparatus according to the present invention, said measurement means may be weighing means. The weighing means may comprise a scale.

According to a third aspect of the present invention, there is provided a computer program comprising instructions that, when the program is executed by a computer, cause the computer to carry out the following steps: receiving, from measurement means, measurement data of a measured current filling quantity; calculating a position of a first pointer on display means as a function of said measured current filling quantity, wherein the position of said first pointer on said display means is a monotonic function of said measured current filling quantity; outputting said position of said first pointer to said display means, wherein a pointer speed of said first pointer being defined as a positional change of said first pointer on said display means with respect to a change of the measured current filling quantity is a strictly increasing function for at least a subrange of the measured current filling quantity in the range between the starting filling quantity and the target filling quantity, while a pointer acceleration of said first pointer being defined as a change of the pointer speed with respect to a change of the measured current filling quantity does not cause a human perception of the displaying to include a discontinuity.

The computer program is thus adapted to carry out the method according to the first aspect. It may be used for the apparatus according to the second aspect.

According to a further aspect of the present invention, there is provided a data carrier having stored thereupon the computer program mentioned above.

BRIEF DESCRIPTION OF THE DRAWINGS

In the following description, the invention will be specified in greater detail by way of example, with reference to the set of drawings, wherein.

DETAILED DESCRIPTION OF THE EMBODIMENTS

Figure 1:
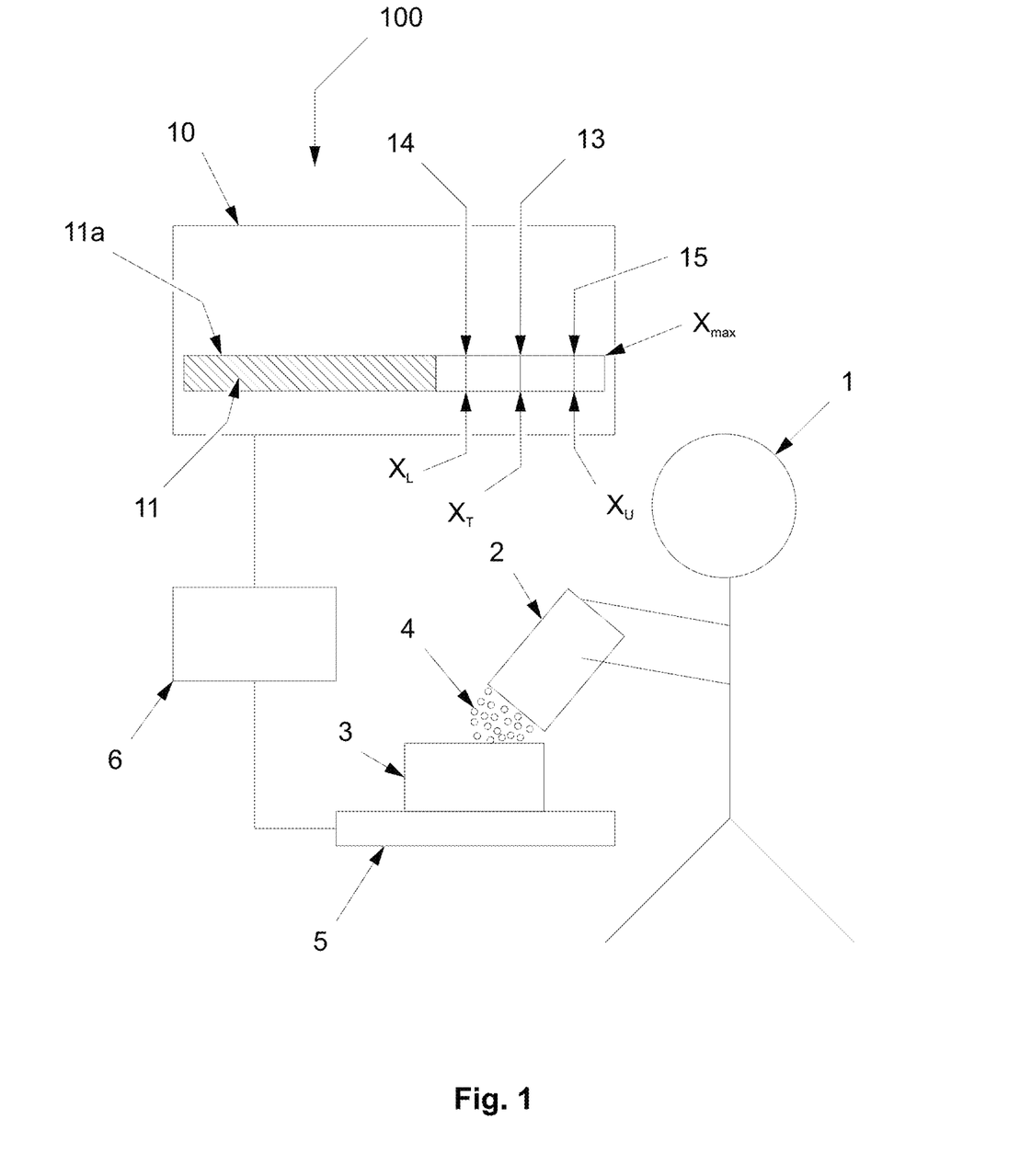
FIG. 1 is a schematic drawing showing an operator performing a filling operation and an apparatus for displaying an evolution of a filling quantity according to the present invention.

FIG. 1 is a schematic drawing showing an operator 1 performing a filling operation and an apparatus 100 for displaying an evolution of a filling quantity according to the present invention.

Figure 2:
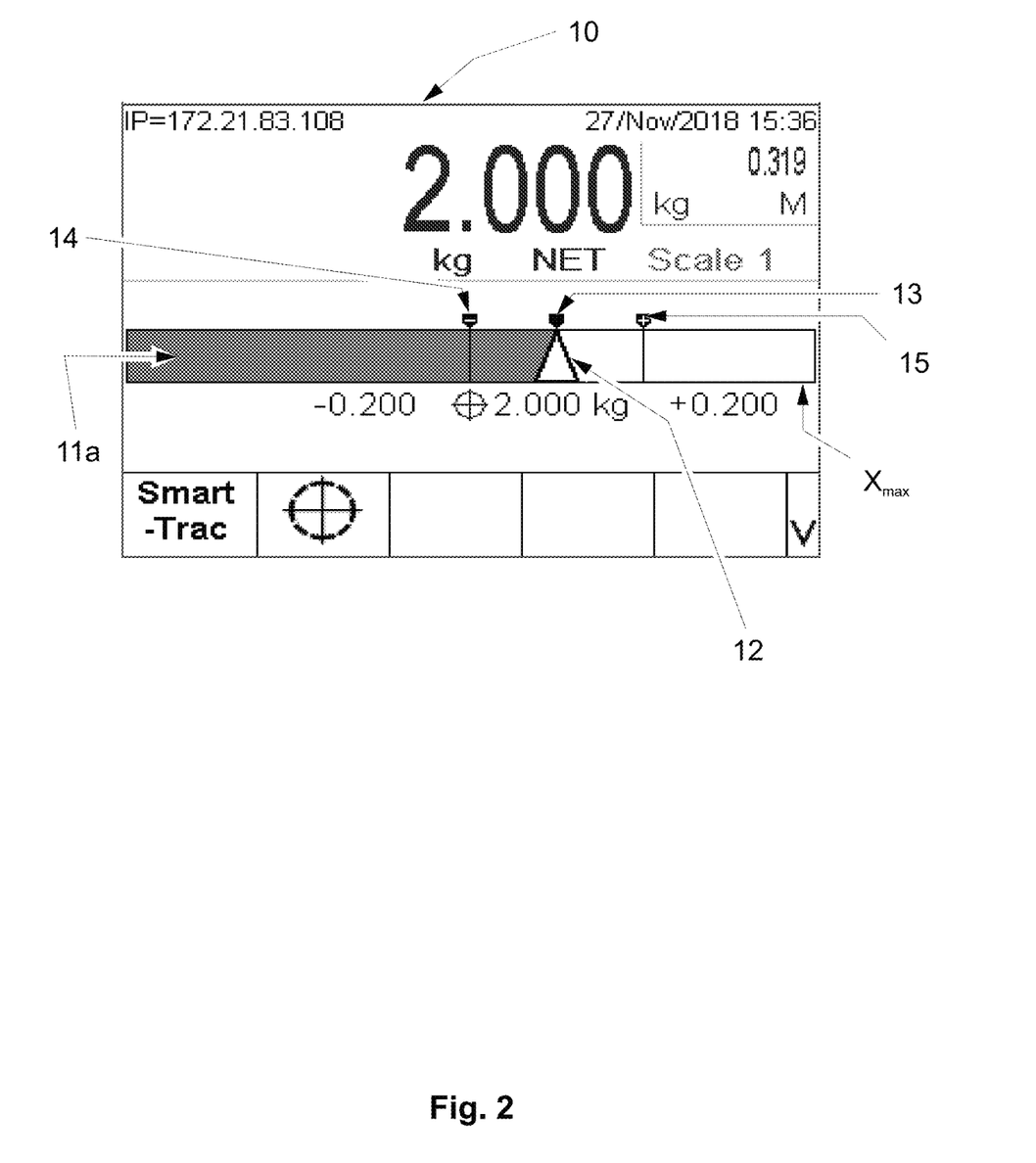
FIG. 2 is a screen view of a possible embodiment of display means depicted in FIG. 1 displaying the evolution of the filling quantity.

In FIG. 1, a container 3 for receiving a material is arranged on measurement means 5, e. g. a scale 5. The measurement means 5 is connected with data-processing means 6. The data-processing means 6 may be electronic data-processing means. The data-processing means 6 is connected with display means 10. A possible example of an embodiment of the display means 10 is shown in FIG. 2.

An operator 1 is filling material 4 from a storage container 2 into the container 3 arranged on the measurement means 5. In FIG. 1, the measurement means 5 are adapted to measure a current filling quantity of the material 4 in the container 3. The filling quantity may be, for example, a filling weight, a filling volume or a number of pieces. The measured current filling quantity Q is output from the measurement means 5 and input into the data-processing means 6. The data-processing means 6 is adapted to calculate, as will be further specified below, a position X of a first pointer 11 on the display means 10.

On the display means 10, a first pointer 11 is displayed. In the embodiment shown in FIG. 1, the first pointer comprises an end of a bar graph 11a. The position X of said first pointer 11 on said display means 10 (which also corresponds to the length of the bar graph 11a) is indicative of the measured current filling quantity Q. The position X of the first pointer 11 on the display means 10 is a monotonic function of the measured current filling quantity Q. In the example shown in FIG. 1, the position X of the first pointer 11 on the display means 10 is a monotonic increasing function of the measured current filling quantity Q. In particular, the position X of said first pointer 11 may be a strictly increasing function of the measured current filling quantity Q, although it is not limited to this.

On the display means 10, a target filling quantity $Q_T$ is indicated by a target indicator 13, e. g. in the form of a triangle, arranged at a position $X_T$ on the display means 10. The position $X_T$ corresponds to the position of the first pointer 11 at the target filling quantity $Q_T$. The target filling quantity $Q_T$ may be input into the apparatus 100 by the operator 1 before carrying out the filling operation. To this end, input means (not shown) may be provided. The input means may be a keyboard or a touch screen. Furthermore, a lower tolerance $T_L$ and an upper tolerance $T_U$ may be specified, and it may be the goal of the filling operation to fill the container 3 with a filling quantity in the range of a lower limit quantity $Q_L$ and an upper limit quantity $Q_U$, wherein the lower limit quantity $Q_L$ is defined as the target filling quantity $Q_T$ minus the lower tolerance $T_L$, and the upper limit quantity $Q_U$ is defined as the target filling quantity $Q_T$ plus the upper tolerance $T_U$. The lower limit quantity $Q_L$ may be indicated by a lower limit indicator 14 arranged at a position $X_L$ on the display means 10 corresponding to the position of the first pointer 11 at the lower limit quantity $Q_L$. The upper limit quantity $Q_U$ may be indicated by an upper limit indicator 15 arranged at a position $X_U$ on the display means 10 corresponding to the position of the first pointer 11 at the upper limit quantity $Q_U$.

There exist many applications where the filling operation must be carried out with a very high accuracy. For example, in the pharma industry, a tolerance of 1% of the target filling quantity or less is common. When a change $\Delta X$ of the position X of the first pointer 11 with respect to a change $\Delta Q$ of the measured current filling quantity Q is the same for all values of the measured current filling quantity Q, it may be impossible for an operator 1 to perceive the change of the position X of the first pointer 11 within the tolerance of 1% or less. To overcome this problem, a "zooming in" in the range of the tolerance is performed as it is known in the art. For example, as it is depicted in FIG. 2, the position $X_L$ of the lower limit indicator 14 (which corresponds to the length of the bar graph 11a at the lower limit quantity $Q_L$) may be 60% of the maximum length of the bar graph (end of the bar graph at position $X_{max}$). This relationship may be kept independently of the size of the tolerance. That is, if the lower tolerance is 1% of the target filling quantity $Q_T$, a filling of up to 99% of the target filling quantity $Q_T$ is represented by a bar graph 11a having 60% of the maximum length of the bar graph. The remaining 1% of the target filling quantity $Q_T$ is represented e. g. by 12.5% of the maximum length of the bar graph. I. e., the length of the bar graph at the target filling value $Q_T$ may be 72.5% of the maximum length of the bar graph. Furthermore, when the upper tolerance is 1% of the target filling value $Q_T$ as well, the length of the bar graph at 101% of the target filling quantity $Q_T$ may be 85% of the maximum length of the bar graph. In this way, an operator 1 is able to monitor the evolution of the filling quantity Q within the upper and lower tolerances $T_u$, $T_L$.

Figure 3:
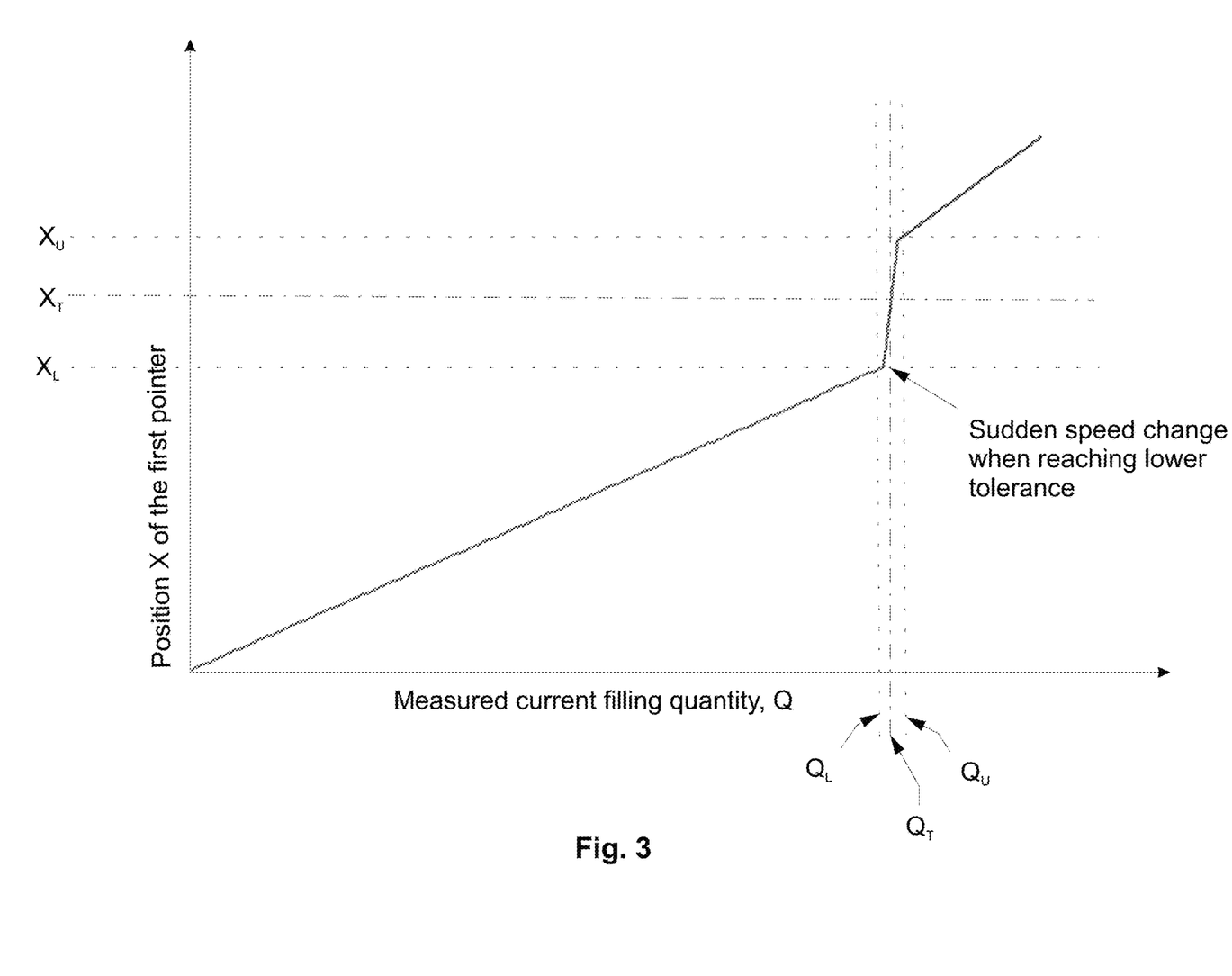
FIG. 3 is a graph showing a first pointer position as a function of a filling quantity as it is known in the art.

While this "zooming in" allows in principle to monitor the evolution of a filling quantity within small tolerances around a target filling quantity $Q_T$, this approach has the following problems as can be understood with reference to FIG. 3. FIG. 3 shows a position X of a first pointer 11 as a function of the measured current filling quantity Q, as explained above. In an interval from the starting filling quantity $Q_0$ to the lower limit quantity $Q_L$, the position X of the first pointer on the display means is a first linear function $X1(Q)=A_1 \cdot Q$ of the measured current filling quantity Q. In the interval between the lower limit quantity $Q_L$ and the upper limit quantity $Q_U$, the position X of the first pointer is a second linear function $X_2(Q)=A_2 \cdot Q$ of the measured current filling quantity Q. $A_2$ is much larger than $A_1$. In this way, even a small change in the measured current filling quantity Q within the tolerance range is translated into a change in the position X of the first pointer which may be perceived by a human operator 1. However, this approach has the following problem: The operator starts the filling operation by tipping the storage container 2. Thereby, the measured current filling quantity Q in the container 3 changes. This change can be described by the first derivative of the measured current filling quantity with respect time, $$\frac{dQ}{dt}$$

which will be denoted as filling speed. Then, the perceived change dX of the position X of the first pointer (which corresponds to the change of the length of the bar graph) with respect to time, $$\frac{dX}{dt}$$

which is perceived by the operator is given by the following relationship:

$$\frac{dX}{dt} = \frac{dX}{dQ} \cdot \frac{dQ}{dt}.$$

Since the human brain does not like changes, the operator who is looking at the bar graph will automatically try to keep the perceived speed of the bar graph constant. That is, he will try to keep $$\frac{dX}{dt}$$

constant. For a measured current filling quantity Q up to the lower limit quantity $Q_L$, $$\frac{dX}{dQ} = \frac{dX_1}{dQ} = A1.$$

Thus, $$\frac{dX}{dt} = A_1 \cdot \frac{dQ}{dt}$$

and the operator will fill the container with a constant filling speed $v_0$ to keep the perceived speed constant, i. e.

$$\frac{dQ}{dt} = v_0 = const.$$

When the measured current filling quantity Q reaches the lower limit quantity $Q_L$, the position of the first pointer on the display means is given by the second function $X_2(Q)=A_2 \cdot Q$, that is, $$\frac{dX}{dQ} = A2.$$

Thus, $$\frac{dX}{dt} = A2 \cdot v_0.$$

As $A_2$ is much larger than A1, there is a sudden change in the perceived speed of the bar graph dX/dt, from $A1 \cdot v_0$ below the lower limit quantity to $A2 \cdot v_0$ above the lower limit quantity which cannot be compensated by the operator. That is, the operator will most likely overshoot the target filling value $Q_T$ and has no chance to stay within the tolerance limits.

Figure 4:
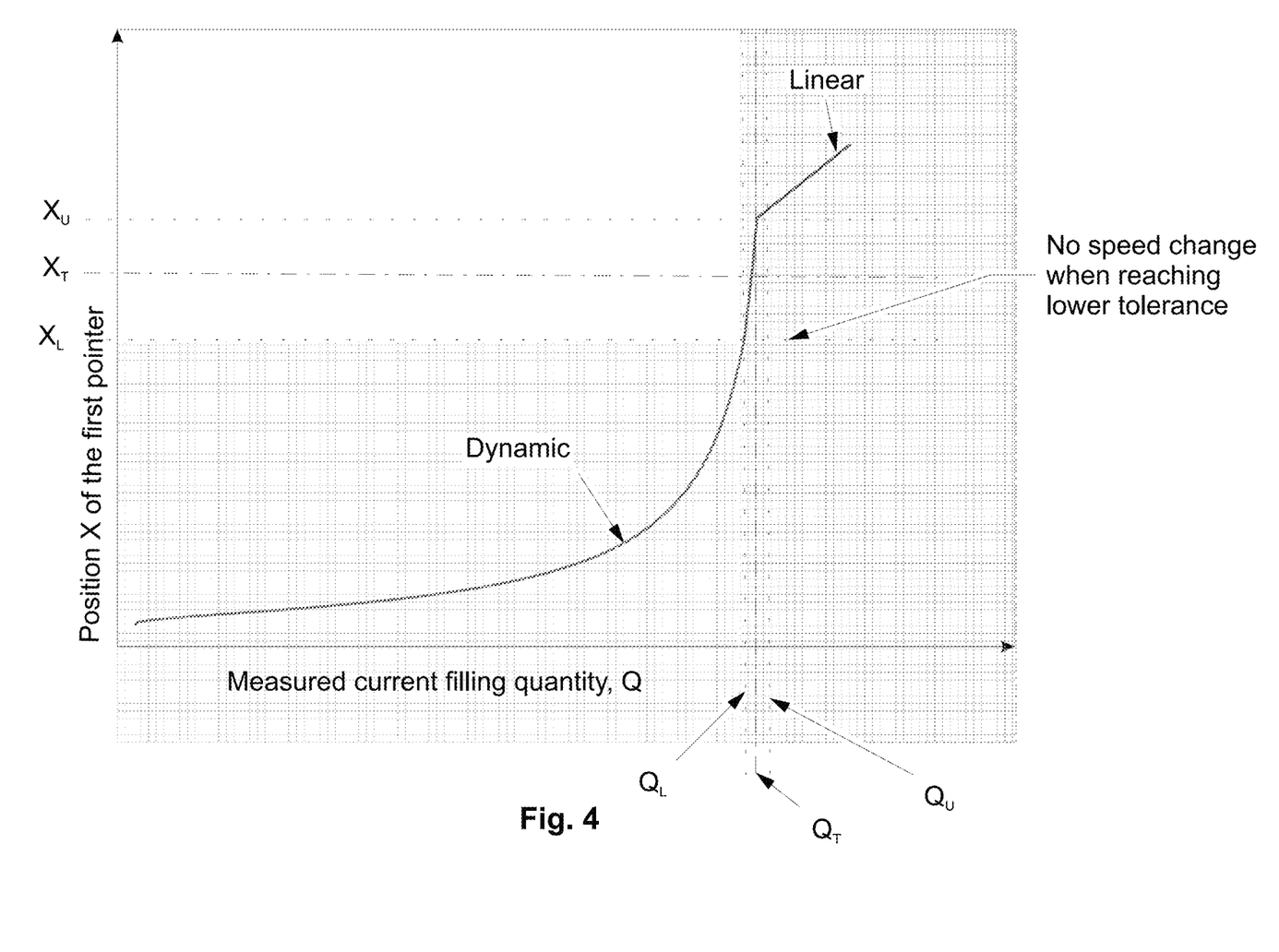
FIG. 4 is a graph showing a first pointer position as a function of a filling quantity according to the method of the present invention.

This problem is overcome by the method according to the present invention, as can be understood with reference to FIG. 4, which is a graph showing a first pointer position as a function of a measured current filling quantity Q according to the method of the present invention. Here, the position of the first pointer is a non-linear function of the measured current filling quantity Q in a range between the starting filling quantity $Q_0$ and the lower limit quantity $Q_L$. In particular, the change ΔX of the position of the first pointer on the display means with respect to a change ΔQ of the measured current filling quantity Q increases as the measured current filling quantity Q approaches the lower limit quantity $Q_L$. This means that the pointer speed of the first pointer being defined as the positional change ΔX of said first pointer on said display means with respect to a change ΔQ of the measured current filling quantity Q, that is, $$\frac{dX}{dQ}$$

is a strictly increasing function between the starting filling quantity $Q_0$ and the lower limit quantity $Q_L$. As it was explained above with reference to FIG. 3, the perceived speed of the first pointer, i. e. a change ΔX of the first pointer position on the display means with respect to time that may be expressed as $$\frac{dX}{dt} = \frac{dX}{dQ} \cdot \frac{dQ}{dt} \cdot \frac{dX}{dQ}$$

increases while the measured current filling quantity Q is approaching the lower limit quantity $Q_L$. As explained before, the human brain does not like changes. Thus, an operator looking at the bar graph while filling the container will try to keep the perceived speed $$\frac{dX}{dt}$$

of the bar graph constant. As $$\frac{dX}{dQ}$$

is increasing, the operator will slow down his filling, that is he will decrease $$\frac{dQ}{dt}.$$

This slowing down is unnoticed by the operator, as the eye-hand coordination is a natural behavior. I. e., the operator will unintentionally slow down the filling speed while the measured current filling quantity Q is approaching the lower limit quantity $Q_L$.

When the measured current filling quantity Q is in a range between the lower limit quantity $Q_L$ and the upper limit quantity $Q_U$, the position X of the first pointer on the display means may be a linear function of the measured current filling quantity Q, $X_2(Q)=A_2 \cdot Q+$const. as it is shown in FIG. 3. A2 may be chosen to be identical or close to identical to the pointer speed of the first pointer below, but close to the lower limit quantity $Q_L$. Then, the pointer acceleration defined as the change of the pointer speed with respect to the measured current filling quantity does not cause a human perception of the displaying to include a discontinuity. In this way, there is a smooth transition between the positional change of the first pointer below the lower limit quantity $Q_L$ and the positional change of the first pointer above the lower limit quantity $Q_L$. There is no sudden change of the perceived speed when the measured current filling quantity Q increases smoothly from a value below the lower limit quantity $Q_L$ to above the lower limit quantity $Q_L$. In this range, the filling operation may then be carried out with a relatively small filling speed, and filling within the tolerance values can be achieved.

To further assist the operator, a second pointer 12 may be displayed on the display means 10, as it is shown in FIG. 2. The second pointer 12 is an additional aid which "magnifies" the filling process for the measured current filling quantity Q between the tolerance limits. The second pointer 12 is similar to a vernier. The second pointer 12 may appear at a certain measured current filling quantity Q below the lower limit quantity $Q_L$ and then move with dynamics similar to the one of the first pointer up to the lower limit quantity $Q_L$. Within the tolerance limits, the dynamics of the second pointer 12 may be similar to the dynamics of the first pointer 11, and may be chosen such that the position $X_v$ of the second pointer 12 is identical to the position $X_T$ of the first pointer 11 on the display means for the target filling quantity $Q_T$. In this way, the filling accuracy may be improved.

Figure 5:
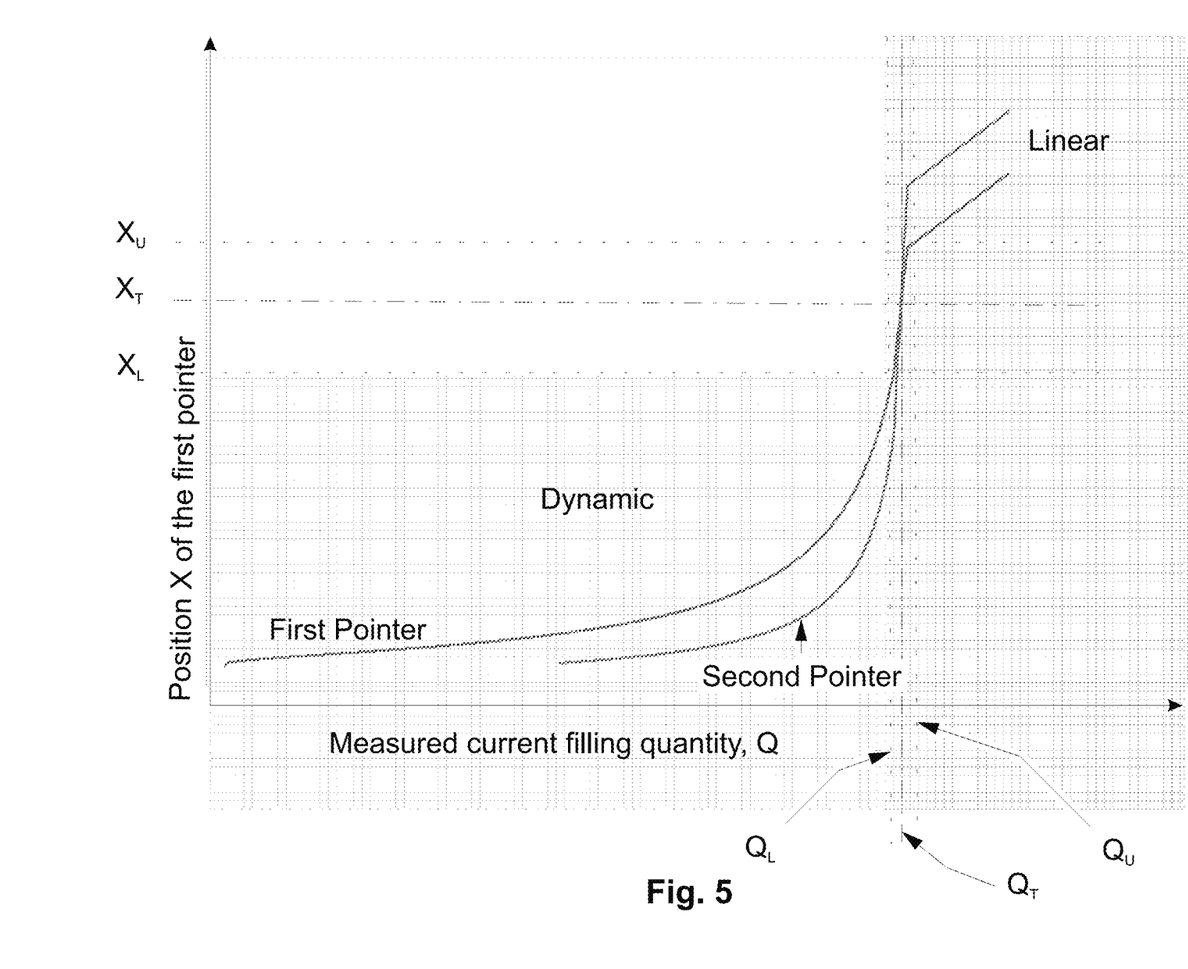
FIG. 5 is a graph showing a first pointer position and a second pointer position as a function of a filling quantity according to the method of the present invention.
Figure 6A:
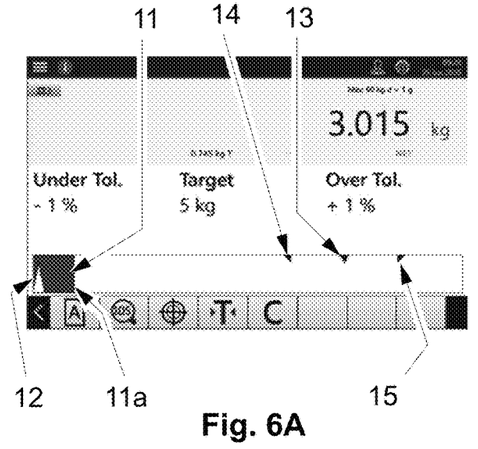
FIGS. 6A to 6F are screen shots of display means displaying an evolution of a filling weight according to the method of the present invention.

To further illustrate the method according to the present invention, FIGS. 6A to 6E depict screen shots of display means 10 displaying the evolution of a filling weight according to the method of the present invention. According to FIGS. 6A to 6F, a target filling weight $Q_T$ of 5 kg with a lower tolerance $T_L$ (under tol) of 1% of the target filling quantity $Q_T$ and an upper tolerance (over tol) of 1% of the target filling quantity $Q_T$ should be achieved. The target quantity $Q_T$, the lower limit quantity $Q_L$ and the upper limit quantity $Q_U$ are indicated by a target indicator 13, a lower limit indicator 14 and an upper limit indicator 15, respectively. The end of a bar graph 11a, which is the position X of the first pointer, is indicative of the measured current filling quantity Q. The position of the first pointer is a monotonic increasing function of the measured current filling quantity Q. In FIG. 6A, the second pointer 12 (vernier) just appeared on the display means 10. The first and second pointers 11, 12 have an almost constant (slow) pointer speed as it is indicated in FIG. 5.

Figure 6B:
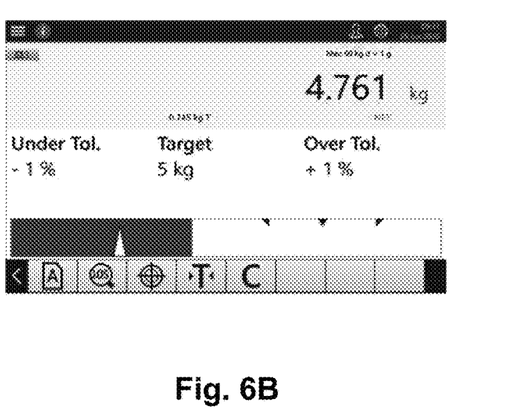
Figure 6C:
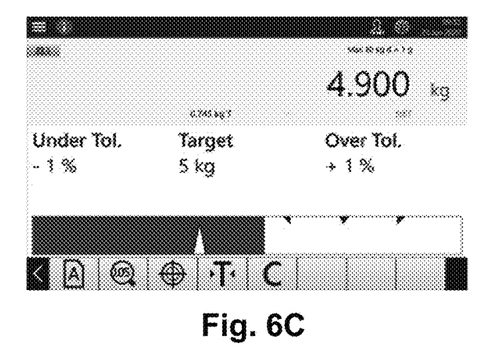
Figure 6D:
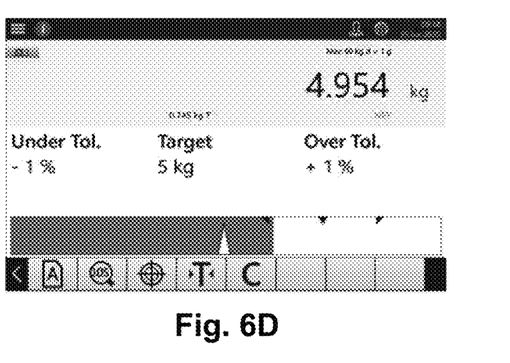
Figure 6E:
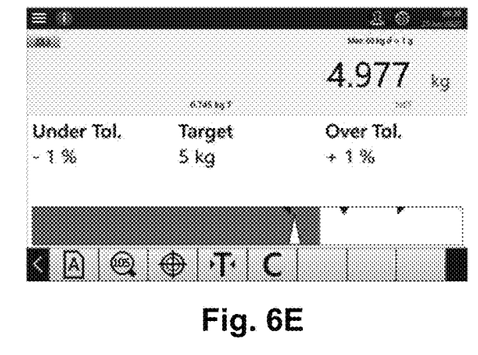
Figure 6F:
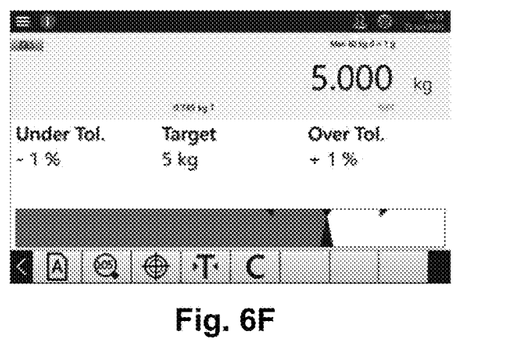

FIG. 6B shows a situation where the measured current filling quantity Q is approximately 95% of the target filling quantity $Q_T$. As can be taken from FIG. 5, the first and second pointers 11, 12 start to accelerate. FIG. 6C shows a situation where the measured current filling quantity Q is about 98% of the target filling quantity $Q_T$. The first and second pointers 11, 12 are now reaching the position $X_L$ of the lower limit quantity. In FIG. 6D, the first pointer 11 has reached the position of the lower limit indicator 14. The position of the first and second pointers 11, 12 is now a linear function of the measured current filling quantity Q between the lower tolerance and the upper tolerance. In FIG. 6E, the measured current filling quantity Q is about 99.5% of the target filling quantity $Q_T$. The first and second pointers approach the target indicator 13. FIG. 6F shows a situation where the target filling quantity $Q_T$ is reached. The color of the second pointer 12 changes to dark, to indicate that the target filling quantity $Q_T$ is reached exactly.

Figure 7A:
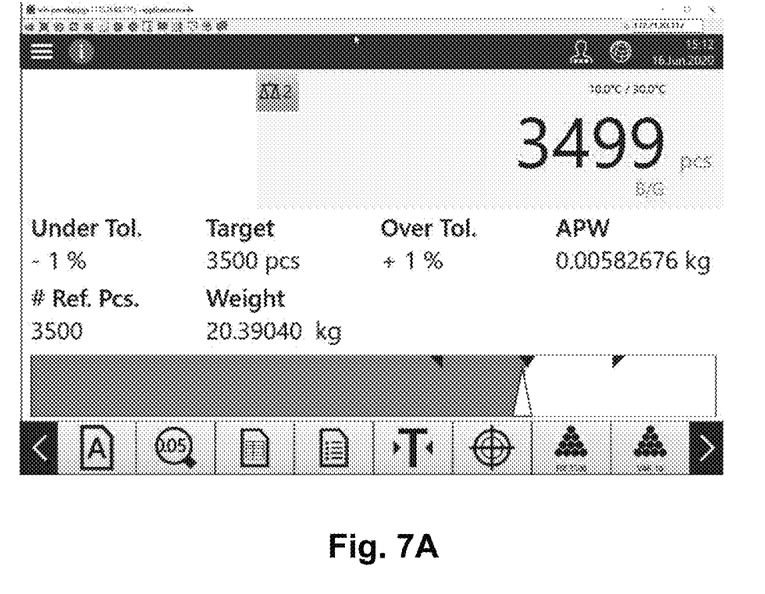
FIGS. 7A and 7B are screen shots of display means displaying an evolution of a filling number according to the method of the present invention.
Figure 7B:
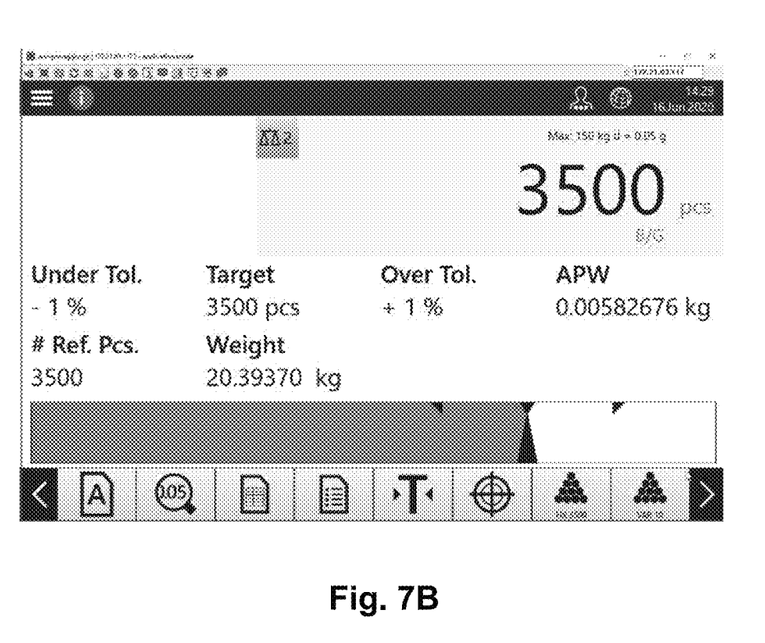

FIGS. 7A and 7B depict two screen shots of display means 10 displaying an evolution of a number of pieces in a container according to the method of the present invention. A target filling quantity of 3,500 pieces is to be reached during the filling operation. FIG. 7A shows a situation where already 3,499 pieces are filled into the container. The second pointer 12 and the first pointer 11 are very close to the target indicator $x_T$. In FIG. 7B, the target filling quantity $Q_T$ of 3,500 pieces is reached.

EXAMPLE a) In the following, an example of the position X of the first pointer on the display means as a function of the measured current filling quantity Q will be described. The filling operation is to be performed from a starting filling quantity of $Q_0=0$ to a target filling quantity $Q_T$, with upper and lower tolerances $T_U$, $T_L$. I. e., at the end of the filling operation, a measured filling quantity Q in the range $Q_L \leq Q \leq Q_U$ should be in the container, wherein $Q_L$ is the lower limit quantity defined as the target filling quantity minus the lower tolerance, $Q_L = Q_T - T_L$, and $Q_U$ is the upper limit quantity defined as the target filling quantity plus the upper tolerance, $Q_U = Q_T + T_U$. $L_{max}$ is the maximum length of the bar graph displayed on the display means.

$$0 \leq Q < Q_L; \qquad \text{i)}$$

$$X(Q) = \frac{1-df}{1-df\left(\frac{Q}{Q_L}\right)^{\frac{1}{N}}} x_L$$

where $Q_L$ is the lower limit quantity defined as target filling quantity $Q_T$ minus the lower tolerance $T_L$, df is a damping factor that ensures that the denominator stays finite (as a particular choice: df=0.99), the radicant $$N = R + \frac{Q_T - Q_L}{Q_T} \cdot r,$$

R>0, and preferably R=6, r>0, and preferably r=3, and $x_L$ is the position of the first pointer at the lower limit quantity, and preferably $x_L$=0.6 $L_{max}$, wherein $L_{max}$.

$$Q_L \leq Q < Q_T: \quad \text{ii)}$$

$$X(Q) = \frac{Q - Q_L}{Q_T - Q_L} \cdot (x_T - x_L) + x_L$$

wherein $x_T$ is the position of the first pointer at the target filling quantity $Q_T$, and preferably $x_T$=0.725·$L_{max}$.

$$Q_T \leq Q < Q_U \quad \text{iii)}$$

$$X(Q) = \frac{Q - Q_T}{Q_U - Q_T} \cdot (x_U - x_T) + x_T$$

wherein $x_U$ is the position of the first pointer at the upper limit quantity $Q_U$, and preferably $x_U$=0.85 $L_{max}$.

$$Q \geq Q_U \quad \text{iv)}$$

$$X(Q) = \frac{Q - Q_U}{Q_T} + x_U.$$

A preferred example is as follows:

$$0 \leq Q < Q_L: \quad \text{i)}$$

$$X(Q) = \frac{1}{1 - 0.99\left(\frac{Q}{Q_L}\right)^{\frac{1}{N}}} \cdot \frac{0.6}{100} L_{max},$$

wherein $N = 6 + 3 \cdot \frac{Q_T - Q_L}{Q_T}$ $$Q_L \leq Q < Q_T: \quad \text{ii)}$$

$$X(Q) = \left(\frac{Q - Q_L}{Q_T - Q_L} \cdot 0.125 + 0.6\right) L_{max}.$$

$$Q_T \leq Q < Q_U: \quad \text{iii)}$$

$$X(Q) = \left(\frac{Q - Q_T}{Q_U - Q_T} \cdot 0.125 + 0.725\right) \cdot L_{max}.$$

$$Q \geq Q_U: \quad \text{iv)}$$

$$X(Q) = \frac{Q - Q_U}{Q_T} + 0.85\, L_{max}.$$

b) In the following, an example of the position $X_v$ of a second pointer (vernier) in addition to the first pointer is given below.

$$0 \leq Q < Q_V: \quad \text{i)}$$
$$X_V(Q) = 0$$

$$\frac{1}{2}Q_L \leq Q < Q_L: \quad \text{ii)}$$

$$X_v(Q) = \left[\frac{1 - df_v}{1 - df_v\left(\frac{Q}{Q_L}\right)^{\frac{1}{N}}} \cdot x_{v,L} - x_\Delta\right] \cdot \frac{1}{m}$$

wherein $x_\Delta = \frac{1 - df_v}{1 - df_v\left(\frac{1}{2}\right)^{\frac{1}{N}}} \cdot x_{v,L}$ $$m = \frac{x_{v,L} - x_\Delta}{x_{v,L}}$$

N is the same as for the first pointer and $df_v$=df as for the first pointer.

Preferably, $x_v$, L=0.475 $L_{max}$.

$$Q_L \leq Q < Q_T: \quad \text{iii)}$$

$$x_v(Q) = \frac{Q - Q_L}{Q_T - Q_L}(x_T - x_{v,L}) + x_{v,L}$$

$x_T$ is as for the first pointer.

$$Q_T \leq Q < Q_U \quad \text{iv)}$$

$$x_v(Q) = \frac{Q - Q_T}{Q_U - Q_T} \cdot x_{v,U} + x_T$$

Preferably, $x_{v,\,L}$=0.475 $L_{max}$.

$$Q \geq Q_U \quad \text{v)}$$

$$x_v(Q) = \frac{Q - Q_U}{Q_T} + x_{v,U} + x_T.$$

For the preferable example of the first pointer position, the position of the second pointer is preferably as follows:

$$0 \leq Q < \frac{1}{2}Q_L: \quad \text{i)}$$
$$x_v(Q) = 0$$

$$\frac{1}{2}Q_L \leq Q < Q_L: \quad \text{ii)}$$

$$x_v(Q) = \left[\frac{1}{1 - 0.99\left(\frac{Q}{Q_L}\right)^{\frac{1}{N}}} \frac{x_{v,L}}{100} - x_\Delta\right]\frac{1}{m}$$

wherein $x_{v,L} = 0.475\, L_{max}$, $$m = \frac{x_{v,L} - x_\Delta}{x_{v,L}} \text{ and } x_\Delta = \frac{1}{1 - 0.99\left(\frac{1}{2}\right)^{\frac{1}{N}}} \frac{x_{v,L}}{100}$$

$$Q_L \leq Q < Q_T: \quad \text{iii)}$$

$$x_v(Q) = \frac{Q - Q_L}{Q_T - Q_L}(x_T - x_{v,L}),\ x_T = 0.725\, L_{max}$$

$$Q_T \leq Q < Q_U: \quad \text{iv)}$$

$$x_v(Q) = \frac{Q - Q_T}{Q_U - Q_T} x_{v,U} + x_T,\ x_{v,U} = 0.475\, L_{max}$$

-continued $$Q \geq Q_U: \quad \text{v)}$$
$$x_v = \frac{Q - Q_U}{Q_T} + x_{v,U} + x_T$$

What is claimed is:

1. A method for displaying, during an operation of filling a material into a container, an evolution of a measured current filling quantity of the material from an initial filling quantity to a target filling quantity, the method comprising the steps of:
    measuring measured current filling quantity, using a measurement means; and
    displaying a first pointer on a display means, where the first pointer has a position on the display means that represents the measured current filling quantity as a monotonic function of the measured current filling quantity, wherein the position of the first pointer is defined as a first function of the measured current filling quantity when the measured current filling quantity is in a first range from the starting filling quantity to a lower limit quantity, and the position of the first pointer is defined as a second function of the measured current filling quantity, different from the first function, when the measured current filling quantity is in a second range from the lower limit quantity to the target filling quantity;
    wherein the first pointer has an artificial pointer speed and an artificial pointer acceleration during the operation of filling;
    wherein the artificial pointer speed corresponds to a first derivative of the function defining the position of the first pointer with respect to the measured filling quantity and the artificial pointer acceleration corresponds to a second derivative of the function defining the position of the first pointer with respect to the measured filling quantity;
    wherein the first function is such that the artificial pointer speed is a strictly increasing function for at least an extended subrange of the measured current filling quantity in the range between the starting filling quantity and the target filling quantity, wherein an endpoint of the subrange is defined by the lower limit quantity.

2. The method of claim 1, wherein the first pointer comprises an end of a bar graph on the display means.

3. The method of claim 2, further comprising the step of:
    determining the position of the first pointer on the display means by electronic data processing means.

4. The method of claim 2, wherein the first pointer comprises further a length of a bar graph, wherein the position of the first pointer on the display means corresponds to the length of the bar graph, wherein a scale of the bar graph is free of any discontinuity.

5. The method of claim 1, wherein the artificial pointer acceleration is a continuous function of the measured current filling quantity.

6. The method of claim 1, wherein the operation of filling the container comprises the steps of:
    filling the container with a filling quantity in the range between the lower limit quantity and an upper limit quantity, wherein the lower limit quantity is the target filling quantity minus a lower tolerance, and the upper limit quantity is the target filling quantity plus an upper tolerance.

7. The method of claim 6, wherein at least one of the following applies:
    the first function and the second function are such that the artificial pointer speed is continuous at the lower limit quantity;
    the first function and the second function are such that the artificial pointer speed is a continuous function;
    the first function is a non-linear function of the measured current filling quantity, and the second function is a linear function of the measured current filling quantity, wherein the slope of the linear function is identical or close to identical to the artificial pointer speed of the first pointer below, but close to the lower limit quantity;
    the first function is defined, in the range of the measured current filling quantity range from the starting filling quantity to the lower limit quantity, by the expression:

$$X1(Q) = \frac{1 - df}{1 - df\left(\frac{Q}{Q_L}\right)^{\frac{1}{N}}} X_L,$$

where df is a damping factor that is greater than 0 and less than 1; and
    the second function is defined, in the range of the measured current filling quantity from the lower limit quantity to the upper limit quantity, by the expression:

$$X2(Q) = \frac{Q - Q_L}{Q_T - Q_L}(X_T - X_L) + X_L,$$

wherein N is a real number greater than 0, Q is the measured current filling quantity, $X_L$ is the position of the first pointer position at the lower limit filling quantity $Q_L$, and $X_T$ is the position of the first pointer at the target filling quantity $Q_T$.

8. The method of claim 6, further comprising the step of:
    displaying a second pointer on the display means, the second pointer having a position that corresponds to a position of a vernier between the respective lower and upper limit quantities.

9. The method of claim 1 wherein the artificial pointer acceleration is artificially limited to avoid a user from perceiving a discontinuity of the displaying and/or to remain below a predetermined threshold.

10. The method of claim 1 wherein the artificial pointer speed is continuous at the lower limit quantity to prevent a discontinuity in display when moving between the first function and the second function.

11. An apparatus for displaying an evolution of a filling quantity of a material in a container from a starting filling quantity to a target filling quantity during a filling operation, the apparatus comprising:
    a measurement means for measuring a measured current filling quantity in the container;
    a display means for displaying a first pointer, a position of the first pointer on the display means being indicative of the measured current filling quantity; and
    a data processing means, the data processing means being adapted to:
        receive the measured current filling quantity from the measurement means;
        calculate the position of the first pointer on the display means as a monotonic function of the measured current filling quantity, such that the position of the first pointer on the display means is a monotonic function of the measured current filling quantity, and output the position of the first pointer to the display means;

wherein the position of the first pointer is defined as a first function of the measured current filling quantity when the measured current filling quantity is in a first range from the starting filling quantity to a lower limit quantity, and the position of the first pointer is defined as a second function of the measured current filling quantity, different from the first function, when the measured current filling quantity is in a second range from the lower limit quantity to the target filling quantity wherein the first pointer has an artificial pointer speed and an artificial pointer acceleration;

wherein the artificial pointer speed corresponds to a first derivative of the function defining the position of the first pointer with respect to the measured filling quantity, and the artificial pointer acceleration corresponds to a second derivative of the function defining the position of the first pointer with respect to the measured filling quantity, wherein the first function is such that the artificial pointer speed is a strictly increasing function for at least an extended subrange of the measured current filling quantity between the starting filling quantity and the target filling quantity, wherein an endpoint of the subrange is defined by the lower limit quantity.

12. The apparatus of claim 11, wherein the measurement means is a weighing means.

13. The apparatus of claim 11, wherein the artificial pointer acceleration is artificially limited to a range in which a user does not perceive a discontinuity in the display of the first pointer and/or to remain below a predetermined threshold.

14. The apparatus of claim 11, wherein the first pointer comprises an end of a bar graph and a length of a bar graph, wherein the position of the first pointer on the display means corresponds to the length of the bar graph, and wherein a scale of the bar graph is free of any discontinuity.

15. The apparatus of claim 11, wherein the data processing means is further adapted to cause the artificial pointer speed to be continuous at the lower limit quantity to prevent a discontinuity in display when moving between the first function and the second function.

16. The apparatus of claim 11, wherein the data processing means comprises electronic data processing means.

* * * * *

UNITED STATES PATENT AND TRADEMARK OFFICE
CERTIFICATE OF CORRECTION

PATENT NO. : 11,893,665 B2
APPLICATION NO. : 17/447473
DATED : February 6, 2024
INVENTOR(S) : Renz

Page 1 of 1

It is certified that error appears in the above-identified patent and that said Letters Patent is hereby corrected as shown below:

In the Specification

In Column 16, Line 34, please delete "Preferably, $x_{v,\,L}=0.475\,L_{max}$." and insert -- Preferably, $x_{v,\,U}=0.475\,L_{max}$. --.

Signed and Sealed this
Twenty-third Day of April, 2024

Katherine Kelly Vidal
*Director of the United States Patent and Trademark Office*